US007914369B2

(12) United States Patent
Walker et al.

(10) Patent No.: US 7,914,369 B2
(45) Date of Patent: Mar. 29, 2011

(54) METHODS AND APPARATUS FOR PLAYING VIDEO POKER WITH A CARD REPLICATING FUNCTION

(75) Inventors: Jay S. Walker, Ridgefield, CT (US); James A. Jorasch, New York, NY (US)

(73) Assignee: IGT, Reno, NV (US)

( * ) Notice: Subject to any disclaimer, the term of this patent is extended or adjusted under 35 U.S.C. 154(b) by 623 days.

(21) Appl. No.: 11/245,852

(22) Filed: Oct. 7, 2005

(65) Prior Publication Data

US 2006/0025192 A1 Feb. 2, 2006

Related U.S. Application Data

(60) Provisional application No. 60/622,072, filed on Oct. 25, 2004.

(51) Int. Cl.
*A63F 13/00* (2006.01)

(52) U.S. Cl. ........... 463/13; 463/16; 463/20; 273/138.1; 273/139

(58) Field of Classification Search .................. 273/292, 273/143 R, 138.1, 138.2, 139, 141 A, 142 B, 273/142 C, 142 J, 148 R; 463/10–34, 1; *A63F 13/00*
See application file for complete search history.

(56) References Cited

U.S. PATENT DOCUMENTS

| | | | | |
|---|---|---|---|---|
| 4,743,022 | A * | 5/1988 | Wood | 463/13 |
| 5,019,973 | A * | 5/1991 | Wilcox et al. | 463/13 |
| 5,531,441 | A * | 7/1996 | Dabrowski et al. | 463/12 |
| 5,531,448 | A | 7/1996 | Moody | |
| 5,591,081 | A * | 1/1997 | Suzuki | 463/13 |
| 5,732,950 | A | 3/1998 | Moody | |
| 5,755,621 | A * | 5/1998 | Marks et al. | 463/42 |
| 5,823,873 | A | 10/1998 | Moody | |
| 5,833,536 | A * | 11/1998 | Davids et al. | 463/11 |
| 5,882,260 | A * | 3/1999 | Marks et al. | 463/13 |
| 5,954,335 | A | 9/1999 | Moody | |
| 5,976,016 | A | 11/1999 | Moody et al. | |
| 6,007,066 | A | 12/1999 | Moody | |
| 6,093,100 | A * | 7/2000 | Singer et al. | 463/13 |
| 6,098,985 | A | 8/2000 | Moody | |
| 6,120,378 | A | 9/2000 | Moody et al. | |
| 6,129,631 | A * | 10/2000 | Hundal et al. | 463/11 |
| 6,159,095 | A * | 12/2000 | Frohm et al. | 463/19 |
| 6,227,969 | B1 * | 5/2001 | Yoseloff | 463/13 |
| 6,257,979 | B1 * | 7/2001 | Walker et al. | 463/13 |
| 6,267,671 | B1 * | 7/2001 | Hogan | 463/25 |
| 6,311,978 | B1 | 11/2001 | Moody | |
| 6,315,291 | B1 | 11/2001 | Moody | |
| 6,364,313 | B1 | 4/2002 | Moody | |
| 6,419,578 | B1 | 7/2002 | Moody et al. | |
| 6,457,714 | B1 * | 10/2002 | Feola | 273/274 |
| 6,478,676 | B1 * | 11/2002 | Dayan | 463/17 |
| 6,517,074 | B1 | 2/2003 | Moody et al. | |

(Continued)

*Primary Examiner* — Arthur O. Hall
(74) *Attorney, Agent, or Firm* — K&L Gates LLP

(57) ABSTRACT

A video poker game is disclosed that provides the player in opportunity to create additional winning game outcomes by forming separate secondary game plays from the primary game play. The secondary game plays are created from indicia in the primary game play that are replicated into the secondary game plays. Only primary game play indicia that at least partially satisfy a predetermined winning game outcome determined for each specific secondary game play may be replicated. The predetermined winning game outcome is selected from a plurality of winning game outcomes. Consequently, a winning game outcome for each secondary game play is limited to less then all the possible game outcomes, or as the primary game may potentially win any of the possible game outcomes.

19 Claims, 10 Drawing Sheets

U.S. PATENT DOCUMENTS

| | | | | |
|---|---|---|---|---|
| 6,533,273 | B2 * | 3/2003 | Cole et al. | 273/138.1 |
| 6,561,898 | B2 | 5/2003 | Moody | |
| 6,568,680 | B1 | 5/2003 | Moody et al. | |
| 6,652,377 | B1 | 11/2003 | Moody | |
| 6,672,959 | B2 | 1/2004 | Moody et al. | |
| 6,910,962 | B2 * | 6/2005 | Marks et al. | 463/16 |
| 6,935,947 | B1 * | 8/2005 | Singer et al. | 463/16 |
| 6,955,356 | B2 | 10/2005 | Moody | |
| 6,964,416 | B2 * | 11/2005 | McClintic et al. | 273/273 |
| 6,964,418 | B2 | 11/2005 | Moody | |
| 6,984,173 | B1 * | 1/2006 | Piechowiak et al. | 463/20 |
| 7,000,921 | B2 * | 2/2006 | Schultz | 273/292 |
| 7,090,579 | B2 * | 8/2006 | Tarantino | 463/20 |
| 7,104,544 | B2 * | 9/2006 | Reiner et al. | 273/292 |
| 7,137,628 | B2 | 11/2006 | Moody | |
| 7,156,397 | B2 | 1/2007 | Moody et al. | |
| 7,222,857 | B2 | 5/2007 | Moody | |
| 7,222,858 | B2 | 5/2007 | Moody | |
| 7,371,169 | B2 * | 5/2008 | Baerlocher | 463/20 |
| 7,399,226 | B2 * | 7/2008 | Mishra | 463/18 |
| 7,404,762 | B2 | 7/2008 | Moody | |
| 7,431,644 | B2 | 10/2008 | Moody | |
| 7,431,648 | B2 * | 10/2008 | Odom et al. | 463/21 |
| 7,452,269 | B2 * | 11/2008 | Gauselmann | 463/16 |
| 7,524,243 | B2 * | 4/2009 | Bansemer et al. | 463/13 |
| 7,553,230 | B2 * | 6/2009 | Cannon | 463/18 |
| 7,666,086 | B2 * | 2/2010 | Baerlocher | 463/20 |
| 7,789,753 | B2 * | 9/2010 | Marks et al. | 463/20 |
| 2004/0229676 | A1 * | 11/2004 | Duhamel et al. | 463/16 |
| 2005/0230917 | A1 * | 10/2005 | Jackson | 273/292 |
| 2009/0005144 | A1 | 1/2009 | Moody | |

* cited by examiner

METHODS AND APPARATUS FOR PLAYING VIDEO POKER WITH A CARD REPLICATING FUNCTION

CROSS REFERENCE TO RELATED APPLICATIONS

The present application claims the benefit of U.S. Provisional Application Ser. No. 60/622,072, filed Oct. 25, 2004, in the name of Walker et al. and entitled "VIDEO POKER METHODS AND APPARATUS" which is incorporated by reference in its entirety for all purposes.

This application is also related to the following co-pending applications:

(i) U.S. patent application Ser. No. 9/858,987 filed May 16, 2001, in the name of Walker et al. and entitled "VIDEO POKER SYSTEM AND METHOD" which is a continuation-in-part of U.S. application Ser. No. 09/165,184, filed Oct. 2, 1998, and which issued as U.S. Pat. No. 6,257,979; and (ii) U.S. Provisional Patent Application Ser. No. 60/637,376 filed Dec. 17, 2004, in the name of Walker et al. and entitled "METHOD AND SYSTEM FOR VIDEO POKER".

The contents of each of these applications are hereby incorporated by reference in their entirety for all purposes.

FIELD OF THE INVENTION

The present invention relates to gaming devices, and more particularly, to video poker methods and apparatus.

BACKGROUND OF THE INVENTION

Gaming has become an increasingly important industry in the United States and around world. Some of the most popular types of gaming are slot type gaming devices and video poker gaming devices. Both of these gaming devices use random numbers to develop game outcomes that can be probabilistically predetermined. The video poker gaming devices differ from the slot type gaming devices in that the player can often make selections that affect the probability of a winning game outcome. Video poker gaming devices offer a variety of different types of poker games or other types of card games such as Blackjack. Because the player can make his own selections during the game play and affect game outcomes, video poker appeals to players that seek to employ a strategy for developing a winning game outcome.

Some video poker games are significantly more successful than others. Because players are constantly looking for new and more exciting games the industry is constantly searching for games that offer players in more exciting game experience and greater entertainment value. To effectively satisfy video poker players, there is an ongoing need for new games that appeal to video poker players' desire for intricate game play strategies.

SUMMARY OF THE INVENTION

Video poker methods and apparatus are provided herein. According to one embodiment, a gaming device is operable to: determine a primary video poker hand, such as an initial configuration of electronically represented playing cards; receive one or more player selection(s), such as an indication of cards to be held or discarded in the primary hand; determine one or more secondary hand(s), e.g. based on the initial configuration and the player selection(s); resolve the primary hand, such as by determining whether a result of game play in the primary hand qualifies a gaming device player for a payout; complete the one or more secondary hand(s) e.g. based on the initial secondary hand(s); and resolve the completed secondary hand(s), such as by determining whether or not one or more of the secondary hand(s) qualifies a gaming device player for a payout.

The above process can be further generally described as allowing the player to build secondary hands based on the replication of cards held in the primary hand to one or more secondary hand(s). The secondary hands may further have the requirement that only specified winning game outcomes may be rewarded. The gaming machine may further provide automatic replication of cards held in the primary card hand to the specific secondary card hands that can use these replicated cards in the formation of the predefined winning game outcome.

One of the advantages of this game play mechanic is the ability to provide players with the potential for a very large payout in the secondary game play. The potential for obtaining a very large award is highly desired by many players. The potential for receiving a very large award in the present invention is enabled by the primary game play in a manner that cannot be achieved by many standard video poker type games. In addition, in contrast to many standard video poker type games, the present invention can potentially allow, in some embodiments, a player to continue participating in game play for a potential award even after the primary game play has been lost.

BRIEF DESCRIPTION OF THE DRAWINGS

Various embodiments of the present invention are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements. Similarly, the illustrated entries represent exemplary information, but those skilled in the art will understand that the number and content of the entries can be different from those illustrated herein. A brief description of the drawings follows.

DESCRIPTION

Figure 1:
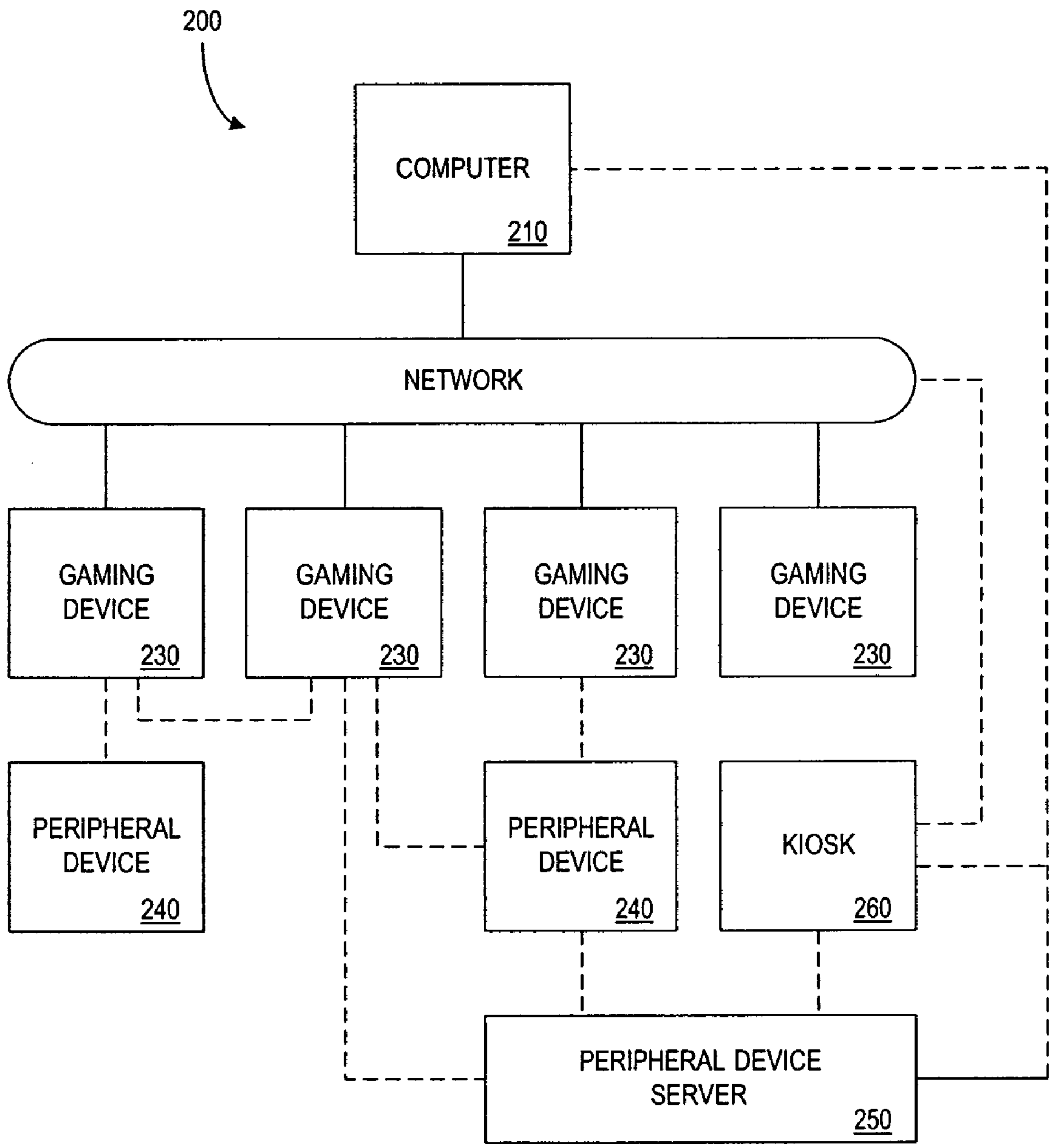
FIG. 1 is a block diagram of an example system, with a computer operable to communicate with one or more gaming devices.

Numerous embodiments are described in this patent application, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms “an embodiment”, “embodiment”, “embodiments”, “the embodiment”, “the embodiments”, “an embodiment”, “some embodiments”, “an example embodiment”, “at least one embodiment”, “one or more embodiments” and “one embodiment” mean “one or more (but not necessarily all) embodiments of the present invention(s)” unless expressly specified otherwise.

The terms “including”, “comprising” and variations thereof mean “including but not limited to”, unless expressly specified otherwise.

The term “consisting of” and variations thereof mean “including and limited to”, unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The terms “a”, “an” and “the” mean “one or more”, unless expressly specified otherwise.

The term “based on” means “based at least on”, unless expressly specified otherwise.

The methods described herein (regardless of whether they are referred to as methods, processes, algorithms, calculations, and the like) inherently include one or more steps. Therefore, all references to a “step” or “steps” of such a method have antecedent basis in the mere recitation of the term ‘method’ or a like term. Accordingly, any reference in a claim to a ‘step’ or ‘steps’ of a method is deemed to have sufficient antecedent basis.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

Where databases are described, it will be understood by one of ordinary skill in the art that (i) alternative database structures to those described may be readily employed; (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

The present invention may be configured to work in a computer network environment 200 as shown in FIG. 1. The computer network 200 of FIG. 1 includes a computer (or server) 210 (e.g., a casino server) that is in communication, via a communications network, with one or more devices, such as gaming devices 230 (e.g., slot machines, video poker machines), kiosks, casino personnel devices, merchant point-of-sale (POS) terminals, component devices (e.g., display screens), peripheral devices (e.g., card readers) etc. The server 210 may communicate with the devices (e.g., 230) directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® processor, that are adapted to communicate with the computer. Any number and type of devices may be in communication with the computer. Communication between the devices (i.e., gaming device 230, peripheral devices 240, kiosk 260, peripheral device server 250) and the server 210, and among the devices, may be direct or indirect, such as over the Internet through a Web site maintained by computer on a remote server or over an online data network including commercial online service providers, bulletin board systems and the like. In yet other embodiments, the devices may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. A variety of communications protocols may be part of the system, including but not limited to: Ethernet (or IEEE 802.3), SAP, SAS™, SuperSAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time. In one embodiment, a server computer may not be necessary and/or preferred. For example, the present invention may, in one or more embodiments, be practiced on a stand-alone gaming device 230 and/or a gaming device in communication only with one or more other gaming devices. In such an embodiment, any functions described as performed by the server 210 or data described as stored on the computer may instead be performed by or stored on one or more gaming devices 230.

The gaming device 230 may be implemented as a system server, a dedicated hardware circuit, an appropriately programmed general-purpose computer, or any other equivalent electronic, mechanical or electro-mechanical device. The gaming device 230 may comprise, for example, a slot machine, a video poker machine, a video blackjack machine, a video keno machine, a video lottery machine, a pachinko machine or hardware for a table-top game. In various embodiments, a gaming device 230 may comprise, for example, a personal computer (e.g., which communicates with an online casino Web site), a telephone (e.g., to communicate with an automated sports book that provides gaming services), or a portable handheld gaming device (e.g., a device similar to a PDA). The gaming device 230 may comprise any or all of the gaming devices of the aforementioned systems. In some embodiments, a user device such as a PDA or cell phone may be used in place of, or in addition to, some or all of the gaming device components. For example, in some embodiments, a gaming device 230 may comprise a wireless handheld device similar to the WifiCasino GS offered by Diamond I Technologies of Baton Rouge, La. Further, a gaming device 230 may comprise a personal computer or other device, which may be operable to communicate with an online casino and facilitate game play at the online casino. In one or more embodiments, the gaming device 230 may comprise a computing device operable to execute software that simulates play of a reeled slot machine game, video poker game, video blackjack game, video keno game, video roulette game, or lottery game.

In some embodiments (e.g., in an embodiment in which the server 210 manages downloadable games playable on one or more gaming devices 230), the computer may store additional databases. Examples of such additional databases include, but are not limited to, (i) a gaming device database that stores information related to one or more gaming devices with which the computer 210 is operable to communicate, (ii) a game database that stores information regarding one or more games playable on and/or downloadable to one or more gaming devices 230, and (iii) a scheduling and/or configuration database useful for determining which games are to be made available on which gaming devices.

Similarly, in one embodiment server 210 may be operable to configure a gaming device 230 remotely, update software stored on a gaming device 230 and/or to download software or software components to a gaming device 230. For example, server 210 may be operable to apply a hot fix to software stored on a gaming device 230, modify a payout and/or probability table stored on a gaming device 230 and/or transmit a new version of software and/or a software component to a gaming device 230. Server 210 may be programmed to perform any or all of the above functions based on, for example, an occurrence of an event (e.g., a scheduled event), receiving an indication from a qualified casino employee and/or other person (e.g., a regulator) and/or receiving a request from a player.

Figure 2:
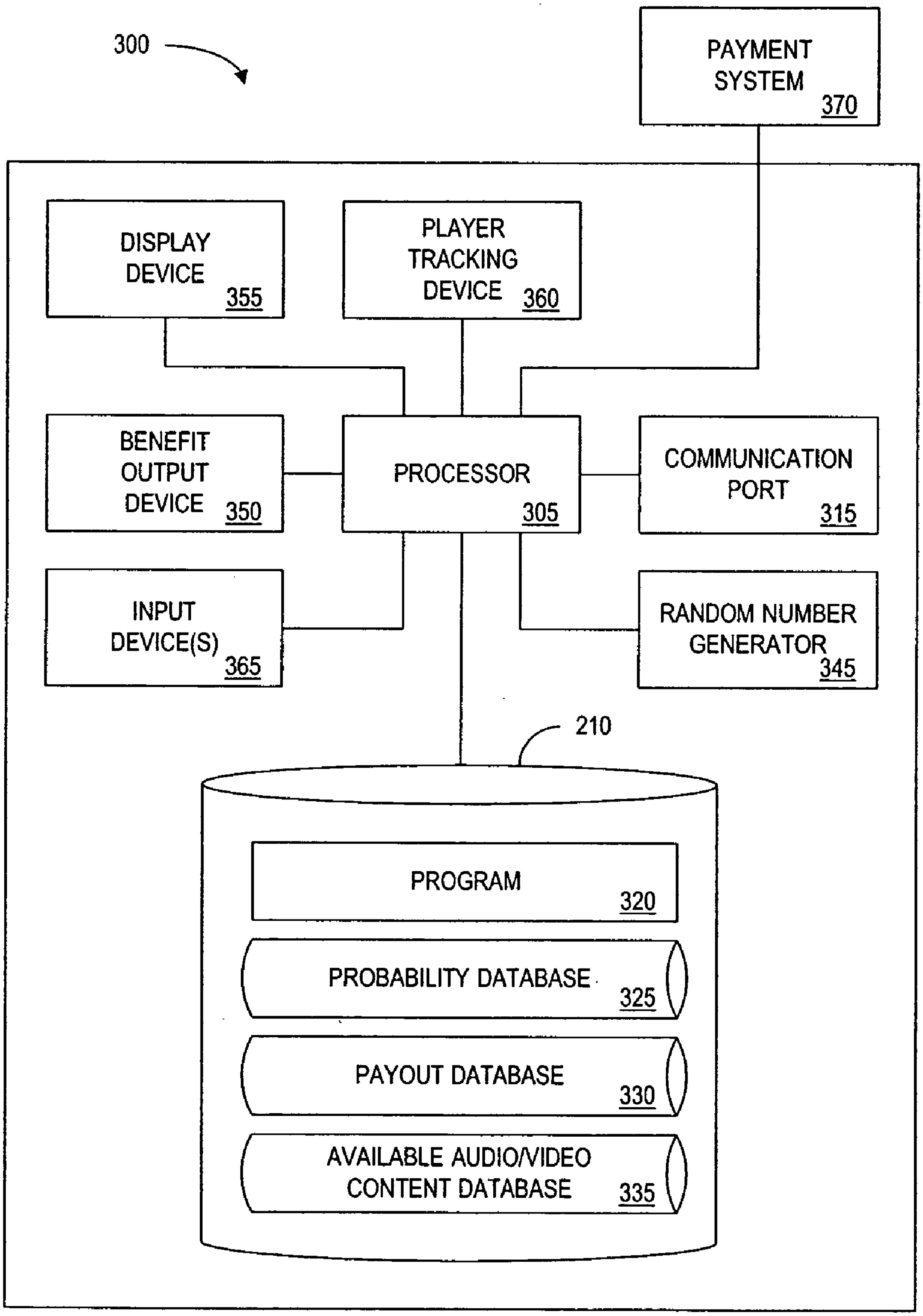
FIG. 2 is a block diagram of a typical gaming device.

Turning to FIG. 2, the gaming device 230 comprises a processor 305 (such as one or more Intel® Pentium® processors) as shown in FIG. 2. The processor 305 is operable to communicate with a random number generator 345, which may be a component of the gaming device 230 (e.g., as part of the gaming device's program 320). The random number generator 345, in accordance with at least one embodiment of the present invention, may generate data representing random or pseudo-random values (referred to as "random numbers" herein). The random number generator 345 may generate a random number, for example, every predetermined unit of time (e.g., every thousandth of a second) or in response to an initiation of a game on the gaming device 230. In the former embodiment, the generated random numbers may be used as they are generated (e.g., the random number generated at substantially the time of game initiation is used for that game) and/or stored for future use. A random number generated by the random number generator 345 may be used by the processor 305 to determine, for example, at least one of an outcome and payout. A random number generator 345, as used herein, may be embodied as a secondary processor, separate from but working in cooperation with the processor 305. Alternatively, the random number generator may be embodied as an algorithm, program component, or software program 320 stored in the memory of the gaming device 230 and used to generate a random number. Note that, although the generation or obtainment of a random number is described herein as involving a random number generator 345 of a gaming device 230, other methods of determining a random number may be employed. For example, a gaming device owner or operator may obtain sets of random numbers that have been generated by another entity. HotBitS™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

Of course, as would be understood by one of ordinary skill in the art, a random number generator may be stored in a device other than a gaming device 230. For example, in some embodiments, a gaming device 230 may receive random numbers and/or any other data related to the random or pseudo-random determination of an outcome from a separate device, such as a server 210. It should be noted that such embodiments may be advantageous in environments or jurisdictions wherein the "central determination" of outcomes is required by regulation or otherwise preferred. Thus, for example, outcomes may be determined centrally by a server 210, and then propagated (e.g., electronically) such that indications of the outcomes may be viewed using one or more gaming devices 230 (e.g., "Class II" gaming devices, "thin-client" gaming devices in a server-based "Class III" gaming architecture, Video Lottery Terminals, and so on).

The processor 305 may also be operable to communicate (e.g., via a protocol such as GDS) with various component devices associated with the gaming device 230, including but not limited to player tracking devices 360, output devices (e.g., benefit output devices 350), input devices 365, and/or input/output devices.

In some embodiments, a benefit output device printer may be a component of gaming device 230. The benefit output device 350 may comprise one or more devices for outputting a benefit to a player of the gaming device 230. For example, in one embodiment the gaming device 230 may provide coins and/or tokens as a benefit. In such an embodiment the benefit output device 350 may comprise a hopper and hopper controller, for dispensing coins and/or tokens into a coin tray of the gaming device.

In another example, the gaming device 230 may provide a receipt or other document on which there is printed an indication of one or more benefits (e.g., a cashless gaming ticket as is known in the art). In such an embodiment, the benefit output device 350 may comprise a printing and document dispensing mechanism.

In yet another example, the gaming device 230 may provide electronic credits as a benefit (which, e.g., may be subsequently converted to coins and/or tokens and dispensed from a hopper into a coin tray). In such an embodiment, the benefit output device 350 may comprise a credit meter balance and/or a processor that manages the amount of electronic credits that is indicated on a display of a credit meter balance.

In yet another example, the gaming device 230 may credit a monetary amount to a financial account associated with a player as a benefit provided to a player. The financial account may be, for example, a credit card account, a debit account, a charge account, a checking account, or a casino account (e.g., an account from which the player may access cashable and/or non-cashable funds using a player tracking card or smart card).

In such an embodiment the benefit output device 350 may comprise a device for communicating with a server 210 on which the account is maintained. Note that, in one or more embodiments, the gaming device 230 may include more than one benefit output device 350. For example, the gaming device 230 may include both a hopper and hopper controller combination and a credit meter balance. Such a gaming device 230 may be operable to provide more than one type of benefit to a player of the gaming device. A single benefit output device 350 may be operable to output more than one type of benefit. For example, a benefit output device 350 may be operable to increase the balance of credits in a credit meter and communicate with a remote device in order to increase the balance of a financial account associated with a player.

The processor 305 may also be operable to communicate with various output devices. In some embodiments, an output device comprises a display device 355. The display device 355 may comprise, for example, one or more display screens or areas for outputting information related to game play on the gaming device 230, such as a cathode ray tube (CRT) monitor, liquid crystal display (LCD) screen, or light emitting diode (LED) screen. In one or more embodiments, a gaming device 230 may comprise more than one display device. For example, a gaming device 230 may comprise an LCD display for displaying electronic reels (or card hands in the case of a video poker gaming device) and a display area that displays rotating mechanical reels.

The display device 355 may comprise, for example, one or more display areas. For example, one of the display areas may display the outcome of a primary game played on the gaming device (e.g., video poker). Another of the display areas (e.g., a secondary game screen) may display rules for playing a game of the gaming device or the outcome of secondary games played in conjunction with the primary game. Yet another of the display areas may display the benefits obtainable by playing a game of the gaming device 230 (e.g., in the form of a payout table).

The processor 305 may also be in communication with one or more other output devices besides the display device 355, for outputting information (e.g., to a person or another device). Such other one or more output devices may also be components of a gaming device 230. Such other one or more output devices may comprise, for example, an audio speaker (e.g., for outputting an outcome or information related thereto, in addition to or in lieu of such information being output via a display device); headphones; an infra-red transmitter; a radio transmitter; an electric motor; a printer (e.g., such as for printing cashless gaming tickets); a dispenser for outputting pre-printed coupons, tickets or vouchers; an infrared port (e.g., for communicating with a second gaming device or a portable device of a player); one or more universal serial bus (USB) ports; a Braille computer monitor; and a coin or bill dispenser. For gaming devices 230, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The processor 305 may also be in communication with one or more input devices 365, which may be capable of receiving an input (e.g., from a player or another device) and which may be a component of gaming device 230. Alternately or additionally, an input device 365 may communicate with or be part of another device (e.g., a server 210, a gaming device 230, etc.). Some examples of input devices include: a barcode scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices 230, common input devices include a button or touch screen on a video poker machine, a lever or handle connected to the gaming device, a magnetic stripe reader to read a player tracking card inserted into a gaming device, a touch screen for input of player selections during game play, and a coin acceptor and bill acceptor.

The processor 305 may also be in communication with a payment system 370, which may be a component of the gaming device 230. The payment system 370 is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system 370 include (i) receiving hard currency (i.e. coins or bills), and accordingly the payment system 370 may comprise a coin or bill acceptor; (ii) receiving an alternate currency (e.g., a paper cashless gaming ticket, an electronic credit, a coupon, a non-negotiable token), and accordingly the payment system may comprise a bar code reader or other sensing means; (iii) receiving a payment identifier (e.g., a credit card number, a debit card number, a player tracking card number, a financial account identifier) and debiting the account identified by the payment identifier; and (iv) determining that a player has performed a value-added activity (e.g., participating in surveys, monitoring remote images for security purposes, referring friends to the casino).

In some embodiments, a gaming device 230 may comprise components capable of facilitating both input and output functions (i.e., input/output devices). In one example, a touch-sensitive display screen comprises an input/output device (e.g., the device outputs graphics and receives selections from players). In another example, a processor may communicate with a "ticket-in/ticket-out" device configured to dispense and receive cashless gaming tickets as is known in the art. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server 210 that manages the accounting associated with such ticket-in/ticket-out transactions (e.g., so as to track the issuance, redemption and expiration of such vouchers). One example of such ticket-in/ticket-out technology, the EZ Pay™ system, is manufactured by International Gaming Technology, headquartered in Reno, Nev.

It should be appreciated that one or more embodiments may include storing graphic and/or sound elements that are used to construct a menu of options available for a player's selection via a touch screen. These elements may be stored, for example, in EEPROM, flash memory, hard disk, CD-ROM, or in any other suitable storage device. The menu may be displayed via any suitable display device, such as a CRT, LCD, VFC, LED display. In one embodiment, the menu may be implemented using only dedicated electromechanical switches. In one embodiment, a player operates an input device 365 of the gaming device 230 to cause such a menu to be displayed. In one embodiment, a gaming device 230 includes a touch screen and a touch screen controller (not shown) associated with a video monitor display device. The touch screen and touch screen controller may be operable to communicate with a video controller of the video monitor display device and a processor 305 (e.g., processor of gaming device). Thus, a player may be enabled to indicate decisions or choices by touching the touch screen in the appropriate places.

In some embodiments, display of the menu of player options may preempt display of other information. For example, in one embodiment the game display device 355 or screen used to display game play indicia (e.g., the cards in a card hand displayed on a video poker type gaming device) during active game play may be used to provide a menu of available options. Typical options a player could select include game volatility and the designation of specific pay tables from which an award, if available, may be determined. In another embodiment, a dedicated display device or screen may be used to display a menu of available options on a continuous, periodic, or other basis.

Of course, as would be understood by one of ordinary skill in the art, a gaming device 230 may comprise various combinations of such component devices. For example, in one or more embodiments, the gaming device 230 may include more than one display device, one or more other output devices, several input devices, and so on (e.g., two display screens, two audio speakers, a ticket-in/ticket-out device and several buttons).

The processor 305 may also communicate with a memory and a communications port (e.g., so as to communicate with one or more other devices). The memory may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver. In one embodiment, the gaming device may comprise one or more devices that are connected to a remote server 210 for maintaining databases.

The memory stores a program 320 for controlling the processor 305. The processor performs instructions of the program 320, and thereby operates in accordance with the present invention, and particularly in accordance with the methods described in detail herein. The program 320 may be stored in a compressed, uncompiled and/or encrypted format.

The program 320 furthermore includes program elements that may be necessary, such as an operating system, a database management system and "device drivers" for allowing the processor to interface with computer peripheral devices. Appropriate program elements are known to those skilled in the art, and need not be described in detail herein.

The term "computer-readable medium" as used herein refers to any medium that participates in providing instructions to the processor of the gaming device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 230 (or, e.g., a server 210) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium; such from a ROM. Execution of sequences of the instructions in program causes processor perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program of a peripheral device 240 in communication with the gaming device 230 may also cause the processor 305 to perform some of the process steps described herein.

The memory may store one or more databases (e.g., probability database 325) described herein. Some or all of the data stored in each database 325 is also described. The described entries of the databases represent exemplary information only; those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

Where appropriate, a prior art probability database 325 may be utilized in the performance of the inventive processes described herein. A probability database 325 may be stored in the data storage device in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator 345; and (ii) an outcome that indicates the one or more indicia comprising the outcome that corresponds to the random number of a particular record. A gaming device may utilize a probability database 325 to determine, for example, what outcome corresponds to a random number generated by a random number generator 345 and to display the determined outcome. The outcomes may comprise the cards randomly selected from a card deck to be displayed on the video display on a video poker gaming machine. If desired, a second probability database may be used to determine the game outcome of a secondary game or bonus game that is commonly associated with the primary game of a gaming device. This second probability database could be constructed to make it more likely—albeit still random—to achieve a winning game outcome in the secondary game. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Further, where appropriate, a prior art payout database may be utilized in the performance of the inventive processes described herein. A payout database 330 may be stored in the data storage device in tabular form, or any other appropriate database form, as is well known in the art. The data stored therein includes a number of example records or entries, each defining an outcome that may be obtained on a gaming device 230 that corresponds to a payout. Those skilled in the art will understand that the payout database 330 may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained winning game outcomes typically obtainable on a video poker gaming machine (e.g., royal flush, straight flush, straight, four-of-a-kind, full house, two pair, three-of-a-kind, and pair). In secondary games or bonus games that are typically associated with primary games, a second pay table may be constructed to determine the award for a winning game outcome in a secondary game.

A gaming device 230 may utilize the payout database 330 to determine whether a payout should be output to a player as a result of an outcome obtained for a game. For example, after determining the outcome to output on the gaming device 230, the gaming device may access the payout database 330 to determine whether the outcome is a winning game outcome having a corresponding payout. If it is a winning game outcome, the gaming device 230 may provide the corresponding payout to the player. Other arrangements of payout databases 330 are possible. For example, the book "Winning at Slot Machines" by Jim Regan (Carol Publishing Group Edition, 1997) illustrates many examples of payout and probability tables and how they may be derived.

Additionally, where appropriate, a player database may be utilized to store historical data associated with specific players. A player database may be used, for example, to store player wager data so that players wagering over a given threshold in a given amount of time may be rewarded for their patronage. The player database may also contain other information that may be useful in, for example, promoting and managing player behaviors (e.g., information about the player's gaming preferences, gaming sessions, outstanding debts, lodging arrangements, and the like). Further, the player database may store data regarding a given player's standing in a game session or bonus game, so that the player can continue the game session or bonus game at a plurality of game machines that have common access to the player database. Such player data may be stored in a relational database and retrieved or otherwise accessed by the processor 305 after receiving a "key" data point from the player, such as a unique identifier read from the player's player tracking card or cashless gaming ticket, PIN or code entered by a player using an input device of the gaming device, and so on.

Note that, although these databases may be described as being stored in a gaming device 230, in other embodiments of the present invention some or all of these databases may be partially or wholly stored in another device, such as one or more of the peripheral devices 240, the peripheral device server 250, central server 210, kiosks 260, casino personnel devices, merchant POS terminals, and so on. Further, some or all of the data described as being stored in the databases may be partially or wholly stored (in addition to or in lieu of being stored in the memory of the gaming device 230) in a memory of one or more other devices, such as one or more of the peripheral devices 240, another gaming device 230, the peripheral device server 250 and/or the server 210.

In one embodiment, gaming device 230 may be operable to facilitate downloadable games such that games available for play on gaming device may be stored on a server device (e.g., server 210 or another dedicated device) and downloaded to the gaming device. In one embodiment, software components of the gaming device 230 may be remotely modified and/or updated by another device (e.g., server 210 or another device). For example, a payout or probability table stored in the memory of gaming device 230 may be altered, modified or updated remotely, hot fixes may be applied to software stored by the gaming device 230 and/or new versions of software may be downloaded to the gaming device. Similarly, the gaming device 230 may be programmed to retrieve any or all such updates from another device, as appropriate and preferred. Any of the above (e.g., downloading of a game, updating of software, modification of a payout or probability table) may occur, for example, based upon an occurrence of an event (e.g., a scheduled event), an indication being received from qualified casino personnel or other personnel (e.g., a regulator), and/or upon a request from a player. In one embodiment, gaming device 230 may comprise a thin client device controlled be a server device (e.g., server 210 or another dedicated device such as the peripheral device server 250).

Figure 3:
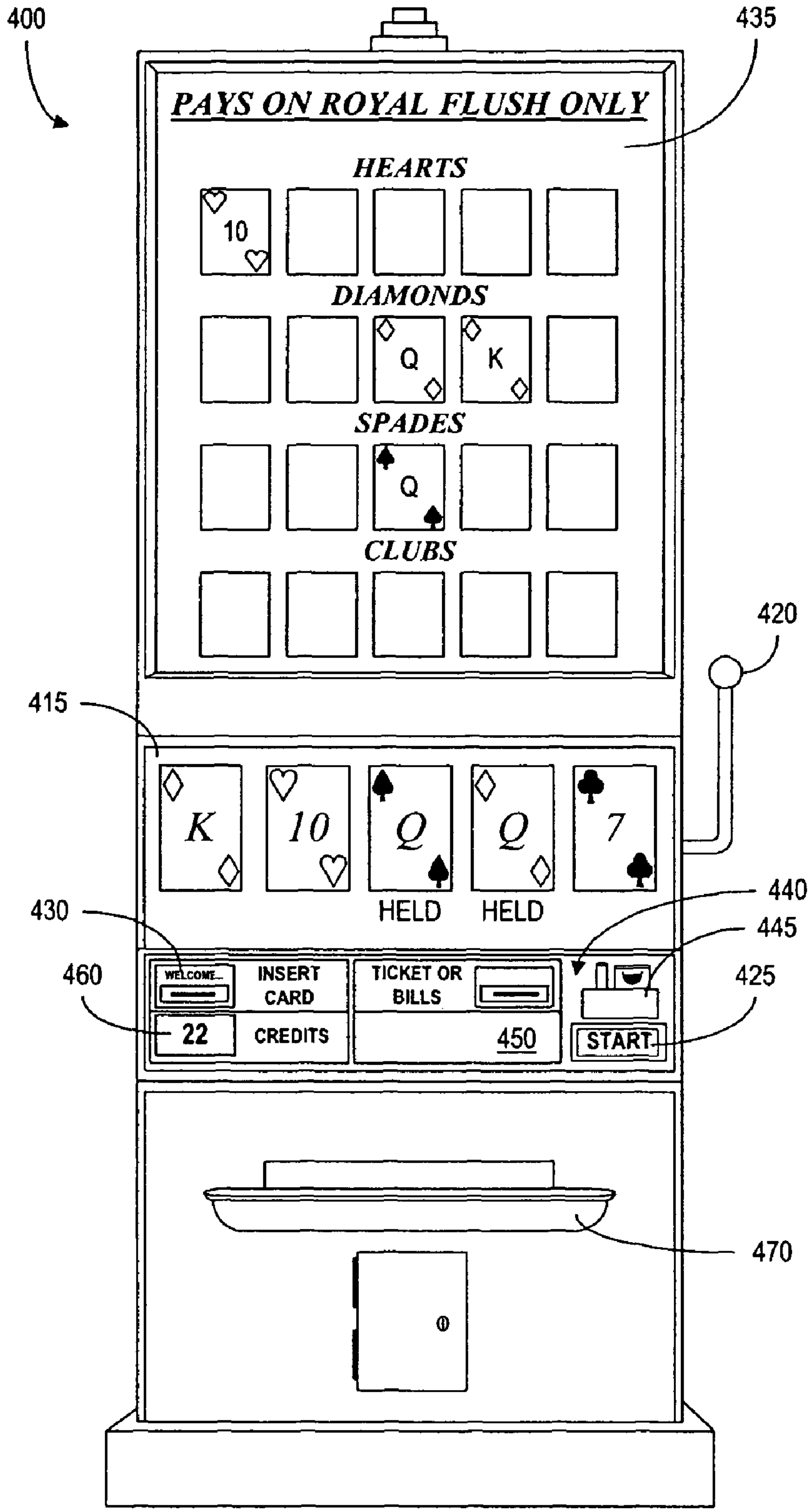
FIG. 3 is a typical video poker gaming device.

As discussed herein, in one or more embodiments the game device 230 may take the form of a video poker gaming machine 400 as shown in FIG. 3 and may be configured to operate in conjunction with the present invention. A more specific description of a gaming machine 400 suitable for use with the present invention follows.

A video poker gaming machine 400 for use in the present invention may comprise, for example, a video display that displays the outcome of a game. In accordance with one or more embodiments of the present invention, an outcome of a game is a set of indicia (e.g. cards) displayed on the video display as a card hand. As shown in FIG. 3, the video poker gaming machine 400 has two display areas, each with its own video display. The primary video display 415 displays the primary game outcome and the secondary video display 435 displays the secondary game outcome. The video gaming machine 400 may also use the secondary game display for outputting information (e.g., payout information, outcome information, etc.) to a player. The secondary game display may be utilized, for example, to inform a player of the player's standing in a game or provide secondary game outcomes.

The gaming machine 400 may further comprise a handle 420. A player may initiate play in the display area by pulling on the handle 420. Alternatively, a player may initiate play by actuating a start button 425. Either or both of the handle 420 and start button 425 are exemplary embodiments of an input device described herein.

The gaming machine 400 may also include a bill acceptor 450, a credit card reader, a coin acceptor 445, and/or a ticket-in/ticket-out device 445; all of which may be generally categorized as wager acceptors 440. A player may utilize the payment system 370 to provide a wager for playing a game and/or for providing payment for provision of an outcome.

The gaming machine 400 may further comprise a credit meter 460, which is an exemplary embodiment of a benefit output device 350 described herein. The credit meter 460 reflects the amount of electronic credits currently available to a player. The electronic credits may be used by a player, for example, as wagers for games played on the gaming device 230. The electronic credits may also be "cashed out" with a payout mechanism such as a coin hopper to dispense coins or tokens, a ticket printer to provide a cashout ticket, a bill dispenser to pay out in paper currency (i.e., bills), or to provide a cashout strip, and/or electronic credits to another financial account associated with the player.

Finally, the gaming machine 400 may comprise a coin tray 470. Payment to the player may be rendered by dispensing coins into the coin tray 470. Such coins may be dispensed based on, for example, a player's indication that the player would like to cash out his credit meter 460 and/or a payout obtained by a player as a result of playing a game on the video poker gaming machine 400. The coin tray 470 is an exemplary embodiment of the benefit output device 350, described herein. Note that, where appropriate, the video poker gaming machine 400 may include different and/or additional components besides those discussed in this section and in various component configurations.

As described, in some embodiments, a gaming device 230 may comprise a player tracking device 430 for reading data from player tracking cards and/or smart cards, such that (i) players may be identified, and (ii) various data associated with players may then be determined (e.g., a number of cashable credits; a number of promotional credits that may not be redeemed for cash; a number of accumulated loyalty points; a number of accumulated game elements such as symbols, cards or hands; etc.). In one example, a card reader device 430 may determine an identifier associated with a player (e.g., by reading a player tracking card comprising an encoded version of the identifier), such that the gaming device 230 may then access data (e.g., of a player database, as described) associated with the player. In another example, a smart card reader device may determine data associated with a player directly by accessing a memory of an inserted smart card.

Thus, as known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered bases). Accordingly, in one or more embodiments one or more devices operable to carry out various processes of the present invention (e.g., a gaming device or kiosk) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

The smart card, as mentioned above, may carry data related to the player including player identification information, wagering data, etc. In addition, smart cards may carry monetary data that provides a player with a balance from which a wager can be drawn. This monetary data may or may not be associated with data in a server 210. The monetary data represented on the smart card may be the sole and exclusive repository for this data. Security for the smart card may include encryption and other security protocols that allow server 210 to verify the monetary value of the smart card once it is inserted into the gaming device 230.

Further, as known in the art, a gaming device 230 may comprise a player tracking module 430 comprising (i) a card reader (e.g., a port into which player tracking cards may be inserted), (ii) various input devices (e.g., a keypad, a touchscreen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by Bally® Gaming and Systems.

A server 210 may be operable to communicate with one or more gaming devices 230, through the gaming device's 230 communication port 315 to assist in player tracking and other communications. According to one or more embodiments of the present invention, other non-card-based methods of identifying players are contemplated. For example, a unique identification code may be associated with the player. The player may then be identified upon providing the code. For example, the code may be stored (e.g., within a database maintained within the gaming device and/or a server) such that the player may enter the code using an input device of a gaming device, and accordingly be identified. In other embodiments, player biometrics may serve as identification means (e.g., a player is identified via a thumbprint or retinal scan). In further embodiments, a barcode of a cashless gaming ticket may encode a player identifier.

Thus, as described, various data associated with a player may be tracked and stored (e.g., in an appropriate record of a centrally-maintained database), such that it may be accessed as desired (e.g., when determining promotional offers or rewards to be provided to players, when determining the status of player with respect to a particular game or period of gambling activity, and so on). Further, various statistics may be measured in association with a player (e.g., coin-in statistics, win/loss statistics) and similarly accessed.

Various systems for facilitating such monitoring are contemplated. For example, a two-wire system such as one offered by International Gaming Systems (IGT) may be used. Similarly, a protocol such as the IGT SAS™ or SuperSAS™ protocol may be used. The SAS™ and SuperSAS™ protocols allow for communication between gaming machines and slot accounting systems and provide a secure method of communicating all necessary data supplied by the gaming device to the online monitoring system. One aspect of the SAS™ and SuperSAS™ protocols that may be beneficial in implementing aspects of the present invention are the authentication function which allow operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors gaming machines and customer gaming activity. Thus, for example, any one of these systems may be used to monitor a player's gaming activity in order to determine player outcomes, coin-in statistics, win/loss statistics and/or any other data deemed relevant.

In some embodiments, a kiosk 260 may be configured to execute or assist in the execution of various processes of the present invention. In some embodiments, a kiosk 260 may comprise a processor and a memory as described. A kiosk 260 may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), benefit output devices (e.g., a coin tray or printer for printing cashless gaming tickets), combinations thereof (e.g., a "ticket-in/ticket-out" device, a touch-sensitive display screen, etc.), communications ports, and so on. Thus, a kiosk 260 may comprise many of the features and components of a gaming device 230, though the kiosk itself may not necessarily be configured to enable gambling activity as a primary function. A kiosk 260 may communicate with any or all of (i) a central controller 210, (ii) a gaming device 230, (iii) an inventory/reservation system of a casino-maintained property (e.g., a hotel), (iv) casino personnel devices, (v) merchant POS terminals, and so on. A number of kiosks 260 may be stationed within casino premises (e.g., at various locations on a slot floor). In various embodiments, kiosks may execute or assist in the execution of (i) determining and outputting a player status or other types of data described herein (e.g., a kiosk receives a player tracking card, and outputs a number of accumulated reward which a player may be entitled to redeem), (ii) outputting payments to players (e.g., upon receipt of cashless gaming tickets, player tracking cards, smart cards, etc.), and/or (iii) any other process described herein. Thus, such a device may be configured to read from and/or write to one or more databases of the present invention. The memory of such a device may store a program for executing such processes.

In some embodiments, various casino employees may be equipped with or otherwise utilize one or more casino personnel devices, such as personal digital assistants (PDAs) or other computing devices (e.g., personal computer terminals). A casino personnel device may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a casino personnel device may communicate with a gaming device 230, server 210, kiosk 260, peripheral device 240, and/or an inventory/reservation system of a casino-maintained property (e.g., a hotel). Thus, a casino personnel device may be configurable to, among other things, (i) read from and/or write to one or more databases of the present invention, (ii) assist in payments made to players (e.g., a representative "scans" a cashless gaming receipt and determines a value associated with the receipt, and if the receipt is valid, provides payment equal to the value), and/or (iii) execute or assist in the execution of various other processes described herein. The memory of such a device may store a program for executing such processes.

In some embodiments, various merchants (e.g., shops, restaurants, etc.) may utilize point-of-sale (POS) computer terminals to facilitate various processes of the present invention. For example, in some embodiments, a player may receive a cashless gaming ticket redeemable for an amount of currency. However, the ticket may alternately or additionally be redeemable for an amount of credit at a particular merchant location. Thus, in some embodiments, merchants may utilize POS terminals to redeem such vouchers. In some embodiments, such devices may be configured to read from and/or write to one or more databases of the present invention. Such POS terminals may thus comprise various hardware and software described herein with respect to other devices, and may communicate with (i) a central slot server, (ii) a gaming device, (iii) an inventory/reservation system (e.g., a computer terminal at a theatre communicates with an inventory database to determine a number of unsold seats for a certain event), (iv) a kiosk, and so on.

In some embodiments of the present invention, various component devices (e.g., any or all of the benefit output devices 350, output devices, input devices 365 and/or input output devices described herein) may be embodied as peripheral devices 240. For example, such devices may not necessarily be components of a gaming device 230, though they may be configured in such a manner so as to communicate with one or more gaming device processors or any other devices described herein. For example, a peripheral device 240 such as a large display device may be associated with a plurality of gaming devices, and thus may not necessarily be considered a component of any one gaming device. Further, in some embodiments, certain peripheral devices 240 such as card readers may be interchangeable between gaming devices 230, and thus may be considered a component of a first gaming device while connected thereto, removed from the first gaming device, connected to a second gaming device, and so on. In other embodiments, various peripheral devices may never be considered a component of a particular gaming device. For example, in some embodiments, a peripheral device such as a USB-based portable memory device may store (i) one or more databases described herein, and/or (ii) a program for executing one or more process steps described herein. Such a peripheral device may then be utilized by casino personnel for upgrading/retrofitting existing gaming devices as described herein.

In one or more embodiments of the present invention, aspects of the present invention may be practiced by replacing and/or augmenting one or more components (e.g., hardware and/or software components) of an existing gaming device. Thus, in one or more embodiments, the invention may be applied as a retrofit or upgrade to existing gaming devices 230 currently available for play within various casinos.

For example, a memory (e.g., computer chip) of the gaming device may be replaced or added, the replacement or additional memory storing a program for instructing the processor of the gaming device to operate in accordance with one or more embodiments of the present invention. In another example, data output via the gaming device (e.g., graphical and/or textual data displayed on the gaming device) may be replaced or added, the replacement or additional data indicating to a player information relevant to one or more aspects of the present invention.

In a specific example, a gaming device 230 may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. One form of memory commonly found gaming devices 230 is electronically erasable programmable read-only memory or erasable programmable read-only memory (EEPROM or EPROM). Thus, in one or more embodiments of the present invention, an EEPROM storing software with instructions for carrying out aspects of the present invention (as well as instructions for carrying out other functions traditionally performed by the gaming device) may replace an EEPROM previously installed in a gaming device, such that the gaming device 230 may be configured to operate in accordance with various processes of the present invention.

For example, a replacement memory module may be made available for purchase to various casino operators. The module, which may comprise various hardware and software components (e.g., an EEPROM storing software instructions), may be installed in an existing gaming device 230 (e.g., a video-reel slot machine, a video poker machine, etc.), such that when the module is installed, players of the device may elect (i) to play a game offered by the gaming device that does not incorporate aspects of the present invention, or (ii) to play a game offered by the gaming device in a manner that utilizes aspects of the present invention. Thus, players who are familiar with the games offered by various gaming devices 230 may elect to pay for them in a different or similar manner as they are accustomed to.

Accordingly, a gaming device 230 may be configured to allow a player to select one of two "modes" of the gaming device, and to enable the selected mode. If a player selects a "standard" mode, the gaming device may be configured to operate in a manner similar to how it operated before the installation of the module (e.g., the gaming device operates in a conventional manner, such that aspects of the present invention may not be utilized). Alternatively, a player may elect to implement various embodiments of the present invention, enabling the gaming device 230 to become operable to execute game play in accordance with one or more aspects of the present invention.

In one example of allowing a player to select one or more modes, a touch-sensitive display screen may be configured to output a prompt asking a player to select a mode of operation. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; etc.). Accordingly, a player may select a mode of operation (e.g., by pressing an appropriately labeled icon of a touch-sensitive display screen), and upon receiving the player's selection, the gaming device may be configured to operate in the selected mode.

In other embodiments, as described, a peripheral device may be useful for implementing one or more embodiments of the present invention into the operation of a conventional gaming device 230. For example, in order to avoid or minimize the necessity of modifying or replacing a program already stored in a memory of a conventional gaming device, an external or internal module that comprises a peripheral device may be inserted in, connected to or otherwise associated with the gaming device.

In still further embodiments, rather than configure existing gaming devices to execute aspects of the present invention by installing or connecting new hardware and/or software, software may be downloaded into an existing memory of one or more gaming devices. U.S. Pat. No. 6,805,634 to Wells et al. teaches methods for downloading data to gaming devices in such a manner. The entirety of U.S. Pat. No. 6,805,634 is incorporated by reference herein for all purposes. Thus, in some embodiments, an existing gaming device may be reprogrammed to accommodate new functionality of the present invention without the need, or by minimizing the need, to remove and replace hardware within the gaming device.

Figure 4:
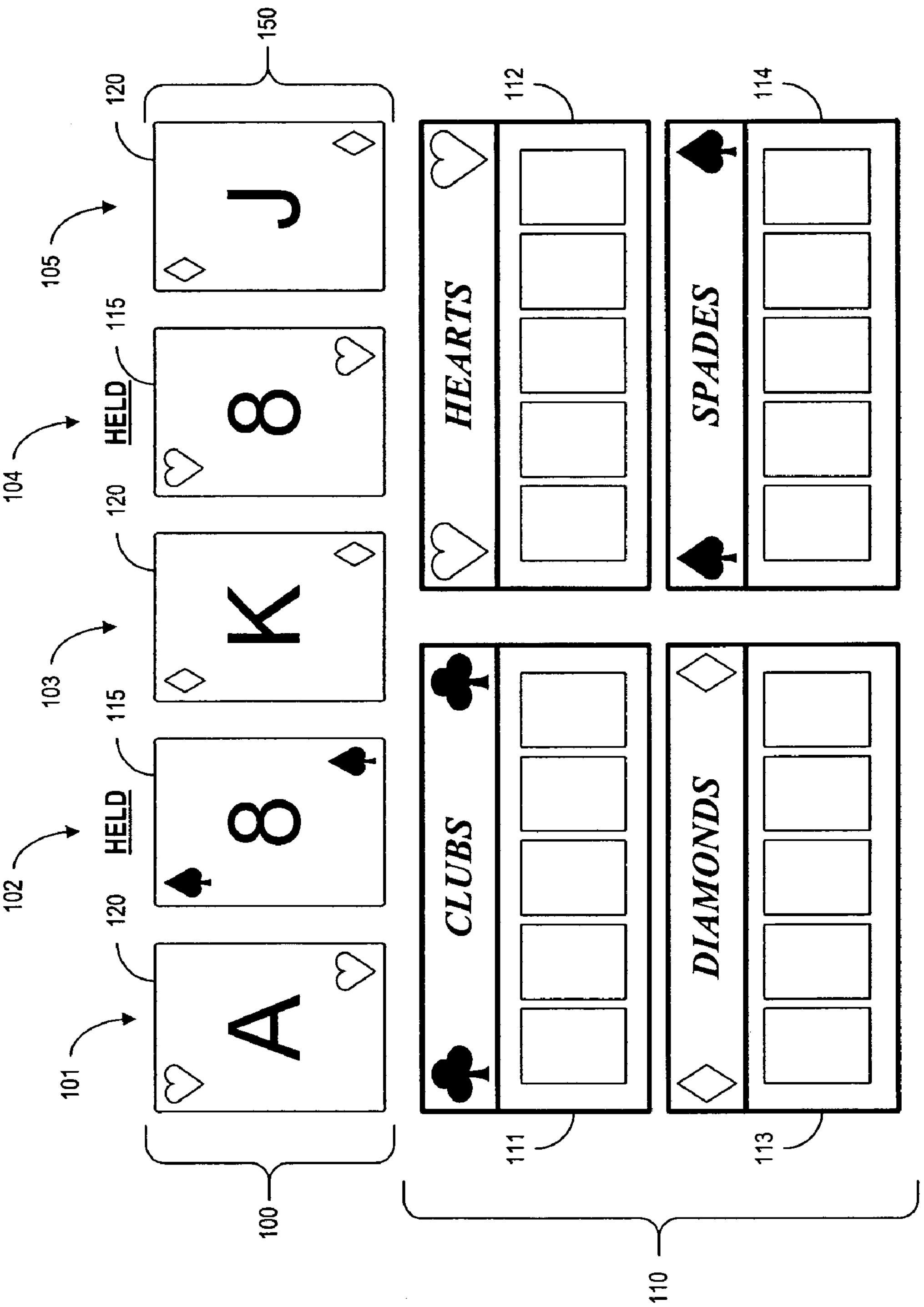
FIG. 4 illustrates a screenshot of the initial game display of the primary game play in one embodiment of the video poker game.

With the above described equipment, most notably the gaming device 230, the present invention can be implemented in various forms and combinations. FIG. 4 illustrates one embodiment of a game play area that may be displayed by a gaming device 230 for use with the present invention. Turning to FIG. 4, a primary game play area 100 includes a plurality of randomly selected indicia (cards) 101, 102, 103, 104 and 105 to form a primary game play 100. Each playing card is associated with (i) a rank (e.g. 3, 4, 5, A, Q, K, etc.) and (ii) a suit (e.g. spades, hearts, etc.), as would be apparent to one of ordinary skill in the art.

In addition to primary game play area, the gaming device 230 of the present invention includes a secondary game play area. The secondary game play area is shown to include four individual secondary game plays 111-114 each corresponding to a particular suit, as are typically associated with playing cards (hearts, diamonds, spades and clubs, respectively). Secondary card hands (or individual secondary game plays 111-114) may be formed in each of these individual secondary game play areas.

As shown in the illustrative example of FIG. 4, the primary game play area includes five individual representations of playing indicia 101-105 (e.g., cards Ah, 8s, Kd, 8h, Jd) in the dealt hand 150 of the primary game play 100. In accordance with primary game play 100, a gaming device player may elect to hold some or all indicia or discard indicia (as represented by the held indicia 115 and the discarded indicia 120). As shown in FIG. 4, the gaming device player has elected held indicia 115 (cards 8s 102 and the 8h 104). Any card having appeared in the primary game play 100 as part of a primary hand or initial configuration, which assists in assembling a predetermined winning game outcome in a secondary game play (e.g., a card hand) 110, is replicated in the secondary game play 110.

Figure 5:
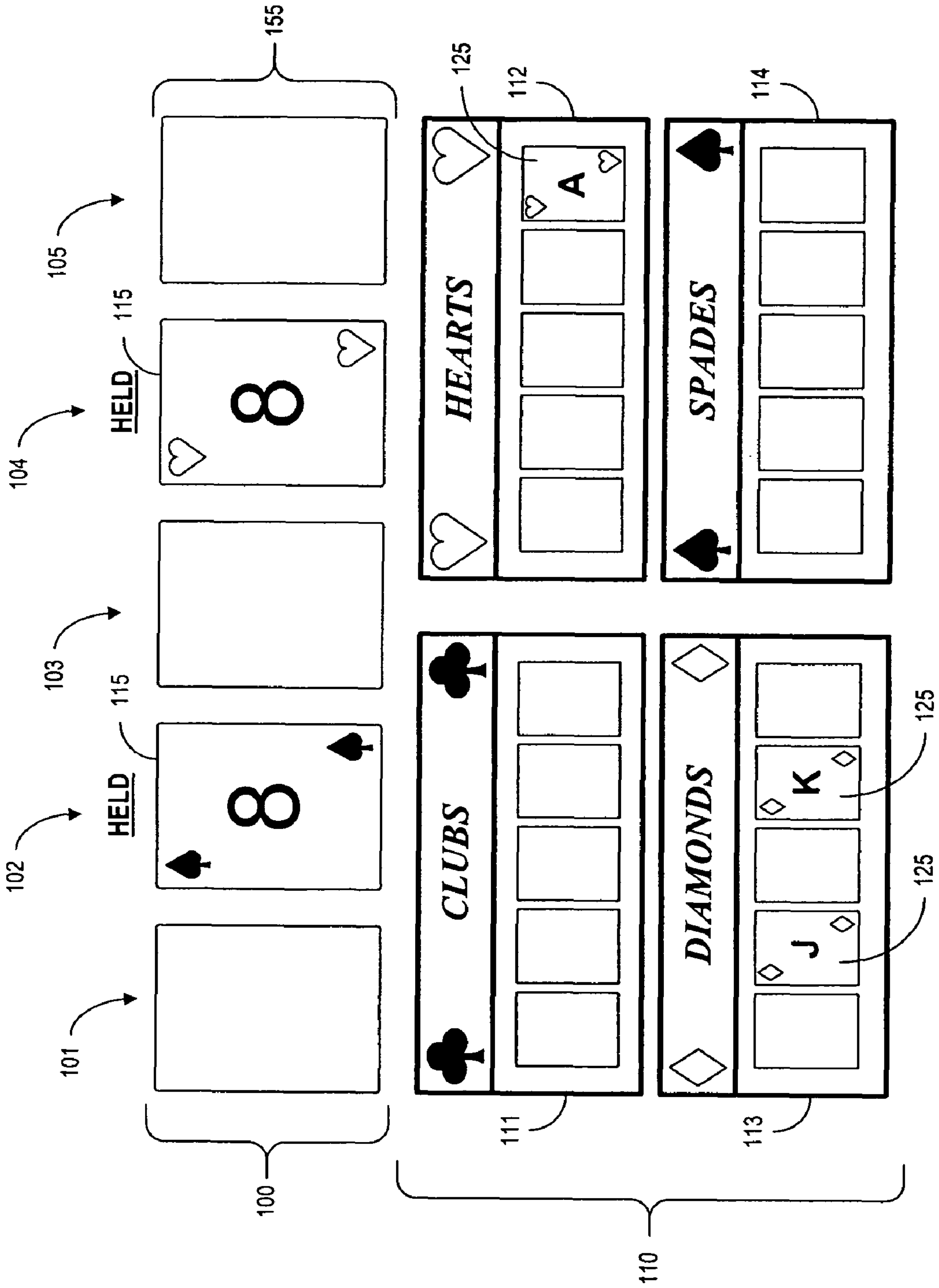
FIG. 5 illustrates the replication of cards from the primary game play from FIG. 4 into each of the secondary game plays that potentially provide a winning game outcome.

For example, referring to FIG. 5, discarded indicia 120 (i.e., cards 101, 103 and 105) have been removed from the primary game play 100 to create a discard hand 155 in the primary game play 100. Replicated indicia 125 (i.e., replicated cards) are shown in the secondary game play 110 in each of the appropriate individual secondary game plays (e.g., card hands) 111-114. In this embodiment, all of the indicia 101-105 in the initial dealt hand 150 of the primary game 100 are eligible to be replicated into the secondary game plays 110. In still another embodiment, replacement indicia 125 may alternately or additionally be replicated into the secondary game play 110. In some embodiments, only the discarded indicia 120 may be replicated into the secondary game plays 110.

In contrast, in still another embodiment, only the held indicia 115 may be replicated into the secondary game plays 110. Further, this embodiment could also allow replacement indicia 125 to be replicated into the secondary game play 110.

In this example, the replicated cards 125 are automatically directed by the gaming device 230 to the appropriate individual secondary game play 111-114 (e.g., secondary card hand) that can potentially form a winning game outcome with that replicated card 125. No player action is required to select the replicated cards 125 in this embodiment. Other embodiments exist that require the player to select the primary game play indicia 101-105 to be replicated into the secondary game play 110—and in some embodiments, the individual secondary game plays (111-114) into which the replicated card 125 is placed. The player may select indicia from the primary game play 100 into the secondary game play 110 by touching and dragging the selected indicia to the desired location with the assistance of a touch screen equipped gaming device 230.

Replicated indicia 125 and discarded indicia 120 are used in two separate game play functions, which may or may not affect the same indicia. Furthermore, replicating indicia may not mean duplicating indicia. In some embodiments replicated indicia 125 stay in the primary game 100 and are replicated into only one or a plurality of individual secondary game plays 110. In other embodiments, the replicated indicia 125 are discarded from the primary game 100 and are replicated into one or a plurality of secondary game plays 110.

According to one embodiment, the indicia displayed in secondary game play 110 may be presented in accordance with one or more rule(s) associated with the secondary game (e.g., defined winning game outcomes). In the illustrative example, a player may be required to obtain a predetermined winning game outcome (such as a royal flush (i.e. 10, J, Q, K and A—all of same suit) in the secondary game play 110 in order to receive an award in the secondary game. Furthermore, in this embodiment, the player is limited to only receiving an award for a royal flush in the individual secondary plays—despite forming otherwise winning game outcomes available in the primary game play 100 in the individual secondary game plays. In other words, in some embodiments, a winning game outcome available in the primary game may not be awarded if formed in the secondary game.

Royal flushes are just one example of a winning game outcome (e.g., rank/suit configuration) that may be required in order to achieve success in the secondary game play 110. The secondary game play may be limited to other winning game outcomes. For example, in traditional poker, the winning game outcome may be limited to straights, full houses, three-of-a-kind or better, etc. Secondary winning game outcomes may also include non-traditional winning game outcomes such as a five-card poker hand comprised of a pair and a 3-card straight, or five-of-a-kind. The required winning game outcome in the secondary game may not be included as a winning game outcome in the primary game. It is also possible to allow some subset of all possible winning game outcomes in the primary game to be won in the secondary game.

For example, individual secondary game plays 111-114 having the same suit categorization described above may allow a player to win a flush, a straight flush, or a royal flush. It is also possible to have a number of individual secondary games plays, each requiring a different predetermined winning game outcome. For example, one secondary game play may require a flush, a second may require a straight, and a third may require a straight flush.

Figure 6:
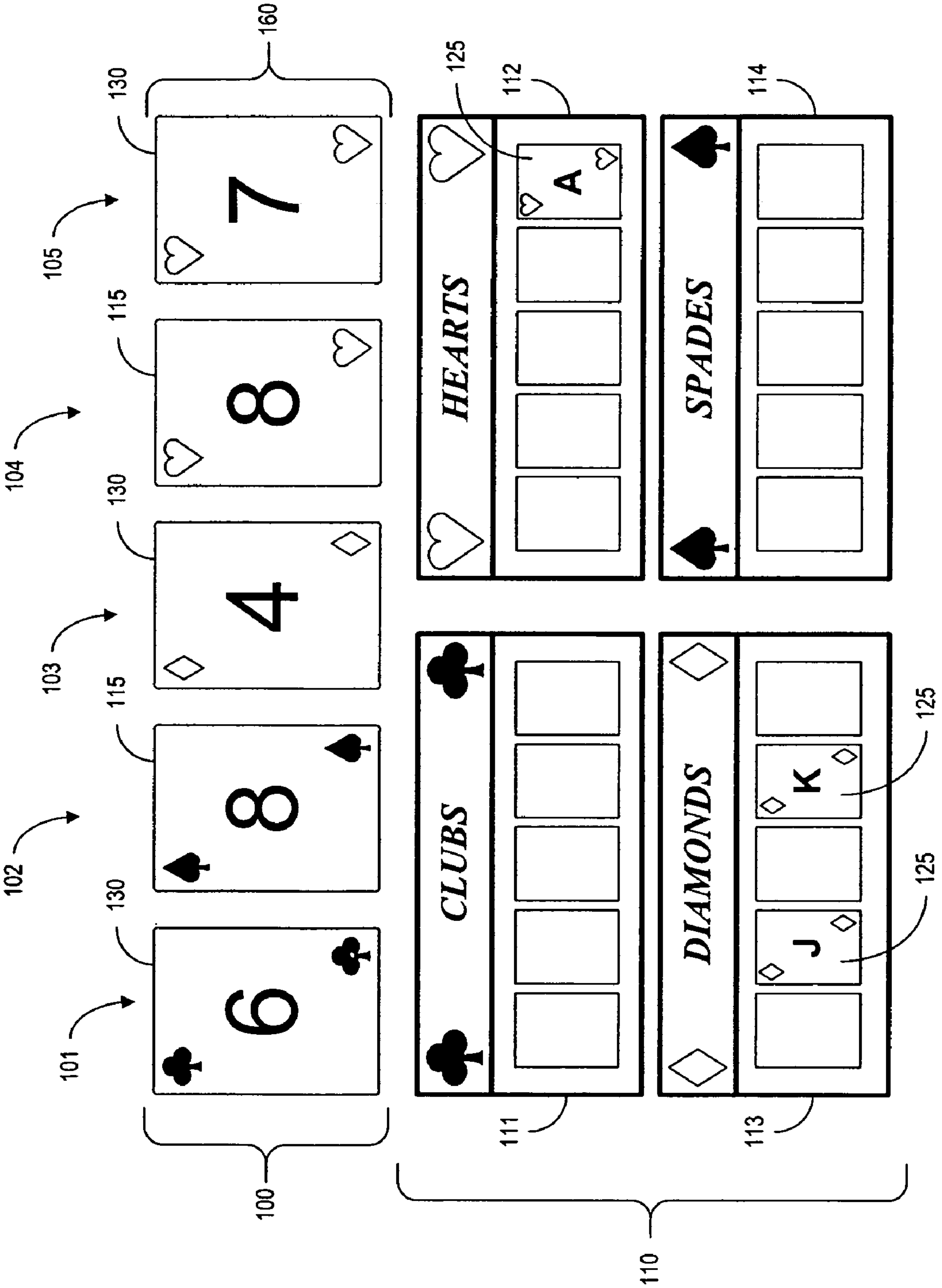
FIG. 6 illustrates the completion of the primary game play of FIG. 5.

Referring now to FIG. 6, replacement indicia 130 (i.e., cards) are provided in the appropriate areas 101, 103 and 105 of the primary game area 100, yielding a primary game outcome (6c, 8h, 4d, 8s, 7h) in the drawn hand 160. Based on the rules of the primary game 100, the primary game outcome may or may not qualify the gaming device player for a winning game outcome and payout. The primary game outcome, in one embodiment, will be eligible for all possible winning game outcomes—unlike the secondary game play which may be eligible for less than all the possible winning game outcomes. For a detailed discussion of video poker payouts as they relate to a primary video poker game, see "VIDEO POKER MANIA", by Dwight & Louise Crevelt, © 1991 by Gollehon Press, Inc.

In some embodiments, a primary game outcome may qualify a player for a first payout, and the player may additionally qualify for a second payout by means of achieving a winning outcome of a secondary game play. In one such embodiment, only one of a first and second payout may be awarded (e.g., a player may only win a payout of a primary or secondary game, though not both). In another embodiment, a player may win a bonus payout (e.g., a multiple of an awarded payout, a separate payout amount, and so on) for achieving a winning primary game outcome in addition to one or more winning secondary game outcomes, and/or for achieving a plurality of winning secondary game outcomes.

Figure 7:
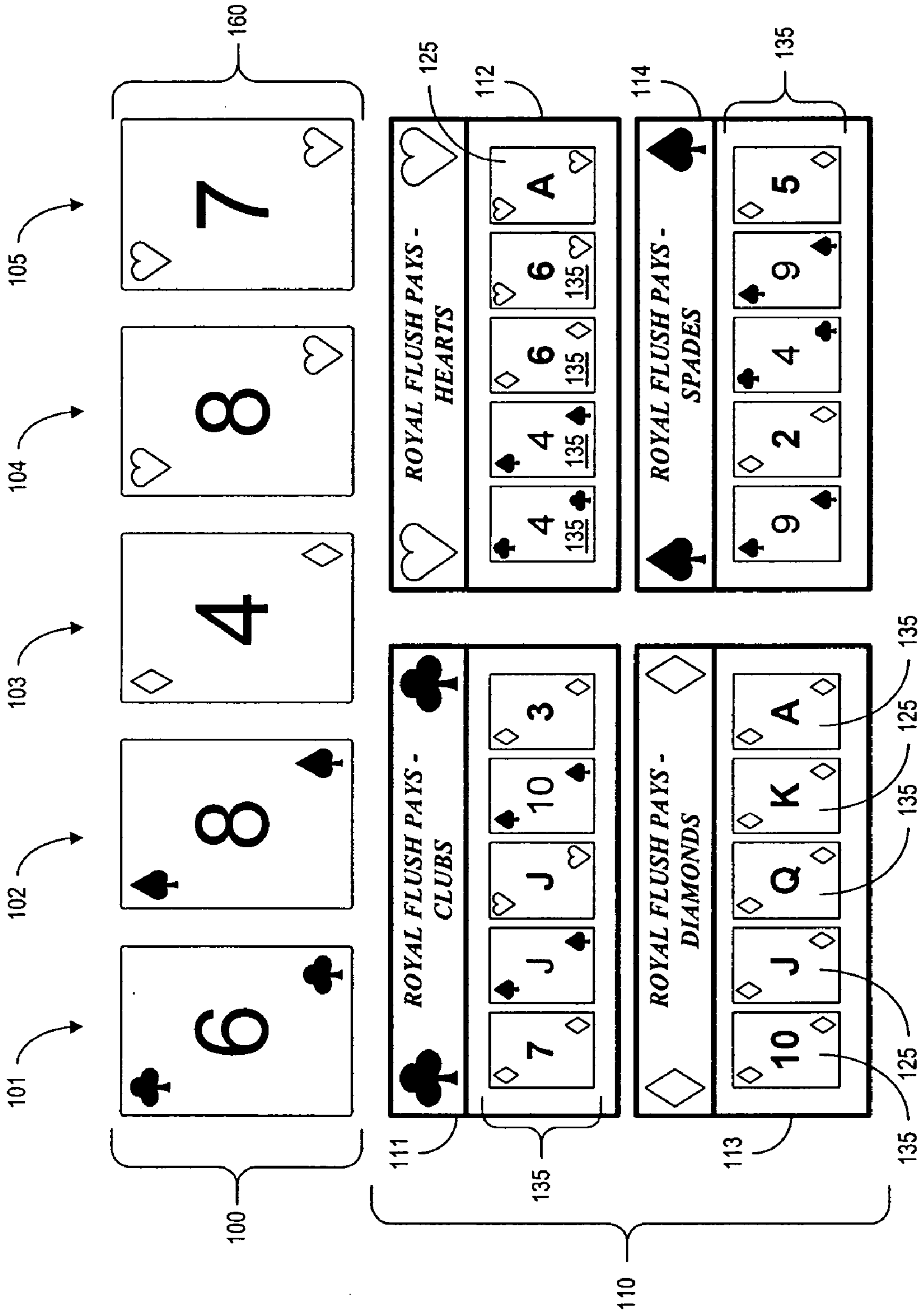
FIG. 7 illustrates the completion of the secondary game plays of FIG. 6 with randomly selected cards.

Referring now to FIG. 7, following completion of the primary game play 100 in primary game play area, the secondary game play 110 is completed. In accordance with the exemplary secondary game play 110 provided, one or more randomly generated indicia 135 are selected and displayed in the individual secondary game plays 111-114 to complete the individual secondary game plays 111-114. For example, where the player has two cards to the diamond royal flush, the gaming device 230 of the present invention may generate (e.g. randomly) three cards to be displayed in the appropriate area of the secondary game play area. All of the secondary card hands may be randomly completed with randomly generated indicia, regardless of whether a replicated card 125 from the primary game occurs in the secondary card hand.

A number and configuration of card decks may be used to provide replacement indicia for the primary game play and randomly generated indicia for both the primary and secondary game plays. For example, a single infinite deck may be used to populate the primary and secondary game place. Alternatively, a separate deck for each of the individual secondary game plays and the primary game play may be used.

As shown in FIG. 7 at 400, in addition to the Jd and Kd (previously assigned to the secondary game area in accordance with the primary game), the gaming device 230 of the present invention has generated 10d, Qd, and Ad, yielding a royal flush in the "DIAMONDS" area of the secondary game play area 110. As a result of having achieved a royal flush in the secondary game play area 110, the gaming device player may be entitled to a bonus payout (e.g. credit, cash or coins, a ticket or receipt redeemable for cash, game credit and/or goods or services, etc.).

Payment of a winning game outcome in the secondary game may be contingent upon the outcome of the primary game. For example the player may only be eligible for a winning game outcome in the secondary game if the primary game is won. Alternatively, the player may only be eligible for winning game outcome in the secondary game if the primary game is lost.

In addition to the individual secondary game play result illustrated at 113 of FIG. 7, the gaming device 230 of the present invention has generated an additional secondary game result in the "HEARTS" area for the individual secondary game play 112. In addition to the Ah (previously assigned to the secondary game area in accordance with the primary game), the gaming device of the present invention has randomly generated indicia 135 to complete the individual secondary game play at 112—4c, 4s, 6d, and 6h.

In some embodiments, the player may not play in secondary game plays 111-114 which do not contain at least one replicated indicia 125. In the embodiment illustrate in FIG. 7, the player has not been so limited, and individual secondary games 111 and 114 have been filled with randomly generated indicia 135, providing the player with additional opportunities to win a royal flush. Further, in some embodiments, the player may not play in secondary game plays 111-114 which the player has not preemptively declared as "active" (e.g., by indicating a particular secondary game play 111-114 through use of an input device). In some embodiments, a fee may be associated with the activation of a secondary game play 111-114.

According to the illustrative example, the secondary game outcome of the "HEARTS" area of secondary game play 112 may fail to qualify the player for a payout or other prize. In this case, the game outcome is not a winning game outcome as it has failed to achieve the predetermined winning game outcome required—i.e., a royal flush. As discussed above, the secondary game results may be required to be at least of minimum cumulative rank or value (e.g. three-of-a-kind, royal flush, etc.) in order to qualify the gaming device player for a payout or other prize, in accordance with the rules of the secondary game.

Figure 9:
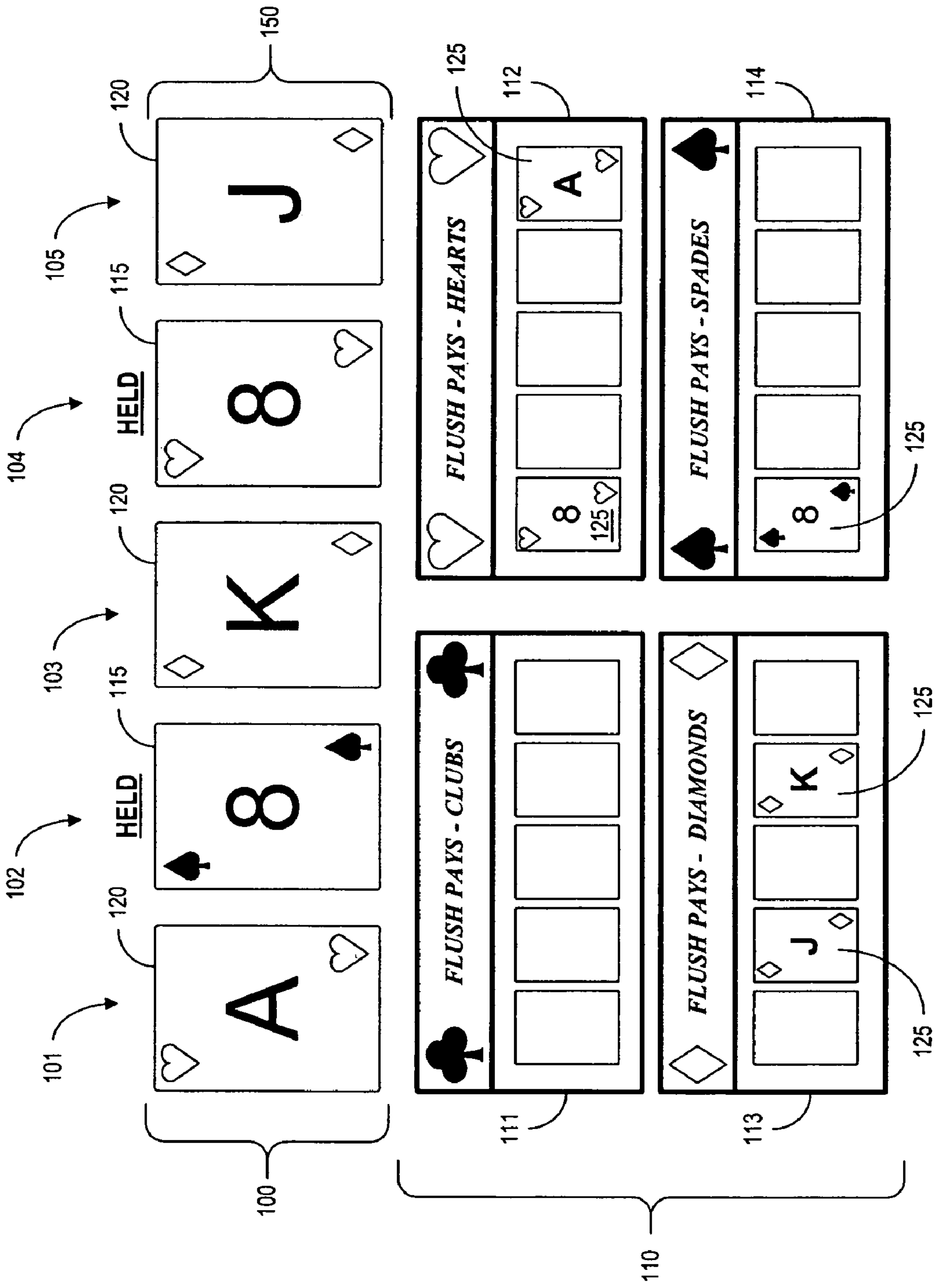
FIG. 9 illustrates an initial game display of an alternate embodiment wherein the predetermined game outcome requires a flush.
Figure 10:
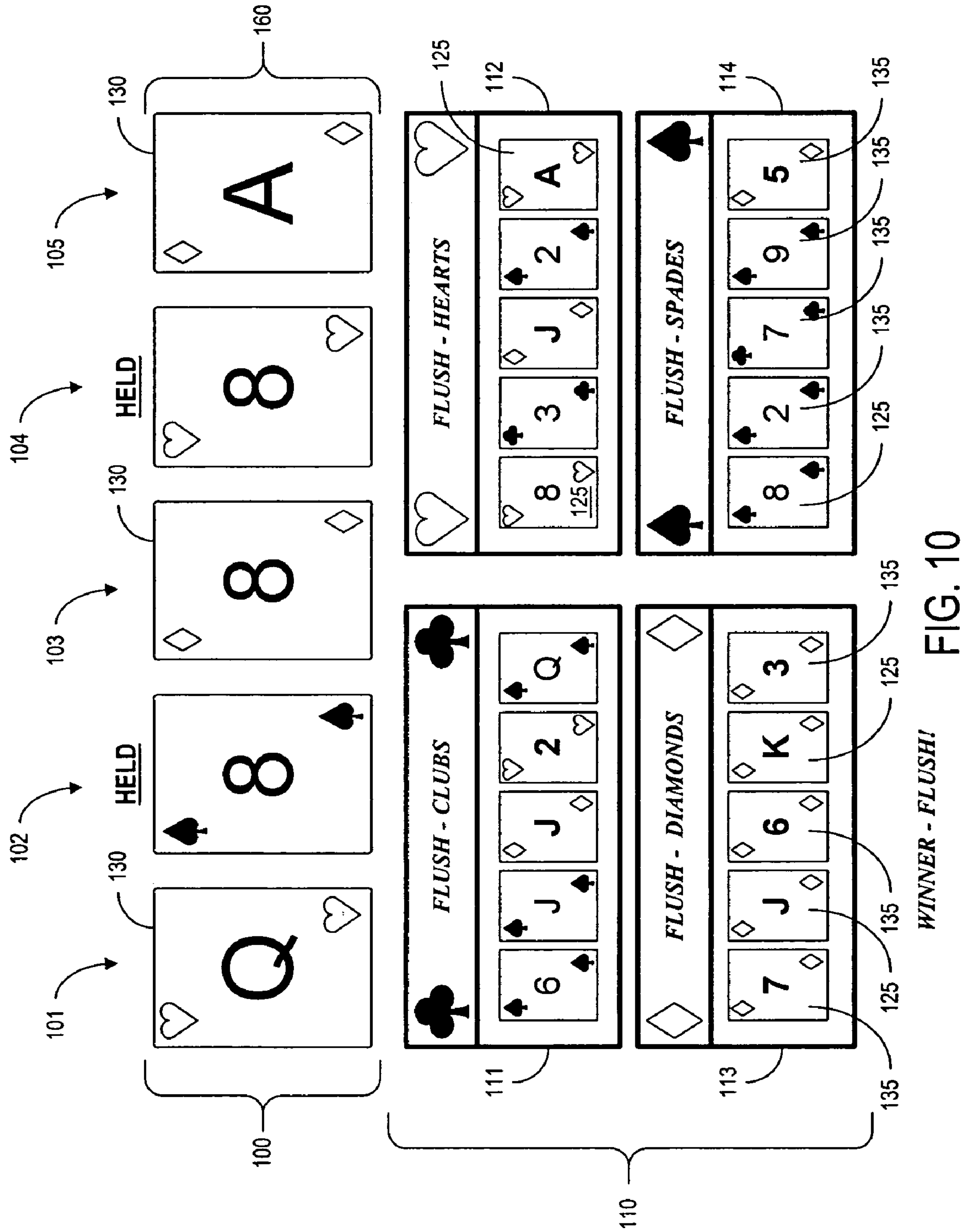
FIG. 10 illustrates the completion of the secondary game plays of FIG. 9 with randomly selected cards.

For example, as shown in FIG. 9, the minimum winning secondary game outcome 110 is a flush. Each of the cards in the primary game 100 have been replicated into the appropriate secondary game plays (111-114) to assist with the formation of a flush hand. As shown in FIG. 10, the gaming device has completed the secondary game plays 111-114 with randomly generated indicia 135. As can be seen from FIG. 10, the player has won a flush in secondary game play 113. None of the remaining secondary game plays have achieved the minimum required winning game outcome (i.e., flush), and consequently, are losing game outcomes (i.e., secondary game plays 111, 112, and 114). Although a winning game outcome available in the primary game play 100 may be formed in the secondary game 110, it will not be provided an award unless that winning game outcome is specifically awarded in the secondary game play.

Figure 8:
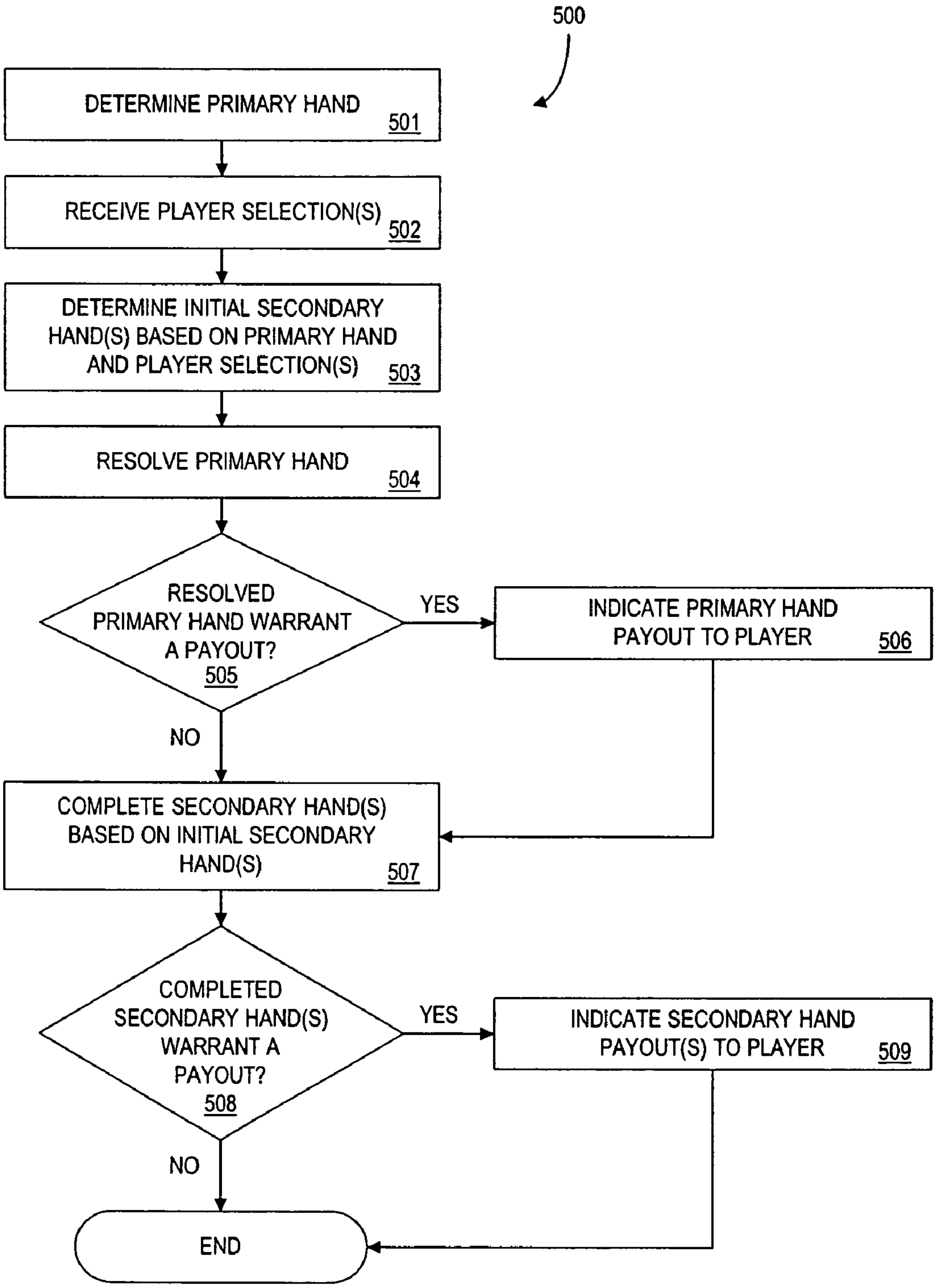
FIG. 8 is a flowchart illustrating an example process of the video poker game, in accordance with one or more embodiments of the present invention.

Referring now to FIG. 8, an exemplary method 500 that may be performed by the gaming device 230 of the present invention is shown. In accordance with various embodiments, the gaming device 230 of the present invention may comprise or include one or more processors, such as the PENTIUM™ processor, manufactured by INTEL® CORP. The processor may be adapted or otherwise programmed to perform various methods described herein, such as the method illustrated in FIG. 8. In accordance with some embodiments, the methods performed to facilitate a secondary game may be performed remotely, such as by a remote server 210, operatively in communication with one or more gaming device(s) 230 as shown in FIG. 1.

At 501, the gaming device 230 determines a primary hand, such as an initial configuration of electronically-represented playing cards to be displayed at primary game play area 100 (FIG. 4). At 502, the gaming device 230 receives one or more player selection(s), such as an indication of which cards are to be held and/or discarded in accordance with conducting play of the primary game. At 503, the gaming device determines one or more initial secondary hand(s) e.g. based on the primary hand. For example, if at least one card included in the primary game is of at least a minimum rank, suit or other value, such card(s) may be employed in the secondary game. For example, if a player is required to obtain a royal flush in secondary game play 110 in order to achieve success in the secondary game, then any card having a rank of 10 or greater (i.e. 10, J, Q, K, A) may be employed in the secondary game.

At 504, play of the primary hand is resolved. More specifically, based on the initial configuration and the previously received player selection(s) and/or a random process, a final hand is determined and evaluated in order to determine a payout (if any) associated with the primary game (step 505). If the primary hand does result in a payout for the player, the primary hand payout is indicated to the player at 506.

At 507, one or more secondary hand(s) are completed, e.g. based on the initial secondary hand(s). For example, the gaming device of the present invention may generate one or more random numbers(s) in order to determine a secondary hand and/or secondary game result.

At 508, the gaming device 230 of the present invention determines whether the previously determined secondary game result qualifies the gaming device player to receive a payout or other prize. For example, the secondary game result may be compared to one or more winning or required secondary game result(s) stored in an outcome table associated with the gaming device 230. If the secondary game result(s) in a payout or other prize to be awarded to the gaming device player, the secondary game result and/or secondary game prize are indicated to the player at 509. Thereafter, process 500 ends.

The above description discloses only exemplary embodiments of the invention; modifications from the above disclosed apparatus and methods which fall within the scope of the invention will be readily apparent to those of ordinary skill in the art.

It should be understood that aspects of the invention may implemented in a number of different games. For example, in one of the embodiments described above, the primary game play 100 is a draw type poker game; however, the present invention can also be applied to stud type poker games that do not provide for discard and replacement cards. Furthermore, the game is not limited to poker type games. This invention could be applied to most card games that have a plurality of different game outcomes. The invention is not limited to card games. This invention could also be applied to video slot-type gaming machines which provide a random set of single characteristic indicia (e.g., traditional slot symbols such as plums, oranges, and watermelons—as opposed to multi-characteristic indicia such as cards with both rank and suit) to determine a winning game outcome.

In addition to the different types of games that the present invention could be applied, there are any number of embodiments that could be created. For example, multiple primary games could be played for each secondary game. The indicia in each separate primary game may be replicated as allowed by the predetermined game outcome into a secondary game—giving the play multiple opportunities to better the player's chance of winning the secondary game play 110. For example, the player may be provided with three separate primary game plays to complete a single secondary game (or a single secondary game with multiple individual secondary game plays). The three separate primary game plays would occur sequentially over time; each of the three primary game plays eligible to replicate indicia into the single secondary game play 110 that is held open until the three primary game plays are completed. In one embodiment, the three primary game plays are purchased with a single wager, allowing the player to hold open the single secondary game for each of the three primary games. The game could further allow randomly selected indicia to complete the secondary game after the player has completed the three separate primary games.

Another potential embodiment, allows the player to play the secondary game only if the secondary game has been partially completed by randomly generated indicia 135 from the primary game. In the case of multiple individual secondary games, the player may be restricted to playing only those that have been at least partially completed by replicated indicia 125.

The player may also be excluded from the secondary game play 110 unless other qualifying requirements are met. For example, the player may be required to place a maximum wager in order to be eligible for the secondary game play 110. Alternately, secondary game play 110 may require an additional wager—in addition to the wager to initiate primary game play 100. Even if the player does not qualify for the secondary game play, the secondary game play may execute to demonstrate to the player what the player could possibly have won by participating in the secondary game play 110.

In addition to all of these embodiments, any number of further embodiments can be envisioned that use or restrict game play to traditionally recognized card game rules. For example this includes limitations on the number of cards that may be replaced, the specific symbol combinations that provide winning game outcomes, the use of wild cards, etc.

Accordingly, the present invention has been disclosed in connection with exemplary embodiments thereof, and it should be understood that other embodiments may fall within the spirit and scope of the invention as defined by the following claims.

We claim:

1. A method of operating a wagering gaming device, said method comprising:

recognizing, via the gaming device, a wager for initiating game play;

displaying, via the gaming device, a primary game play with a plurality of randomly selected indicia from a set of different indicia, wherein selected indicia from the set of indicia can form any of a plurality of different winning game outcomes;

determining, via the gaming device, displayed indicia from the primary game play that at least partially satisfy any designated one of said winning game outcomes for a secondary game play, wherein at least one and less than all of the winning game outcomes are designated winning game outcomes, and each of said designated winning game outcomes is a predetermined different one of said winning game outcomes;

replicating, via the gaming device, only the indicia that at least partially satisfy any of the designated winning game outcomes for the secondary game play to at least partially form the secondary game play;

thereafter, if less than a designated quantity of the randomly selected indicia from the primary game play have been replicated to at least partially form the secondary game play, randomly select additional indicia from the set of different indicia to complete a formation of the designated quantity in the secondary game play using the additional indicia;

determining, via the gaming device, if any of the winning game outcomes occurs for the primary game play;

determining, via the gaming device, if any of the designated winning game outcomes occurs for the secondary game play based on any replicated indicia from the primary game play and any of said randomly selected additional indicia; and providing, via the gaming device, any determined awards associated with any determined winning game outcomes for the primary game play and any awards associated with any determined designated winning game outcomes which occur for the secondary game play.

2. The method of claim 1, further including replacing at least one of the displayed indicia in the primary game play with another randomly selected indicia.

3. The method of claim 2, wherein any displayed indicia in the primary game play are configured to be replaced.

4. The method as described of claim 2, wherein a subset of the displayed indicia in the primary game play are configured to be replaced.

5. The method of claim 2, wherein replicated displayed indicia for the secondary game play are only the indicia replaced in the primary game.

6. The method of claim 1, wherein the replicated indicia for the secondary game play are configured to be replicated from a plurality of primary game plays.

7. The method of claim 1, wherein the secondary game play comprises a plurality of individual secondary game plays, each individual secondary game play is configured to result in one of the designated winning game outcomes.

8. The method of claim 7, wherein each of the replicated indicia is configured to at least partially form only one of the plurality of individual secondary game plays.

9. The method of claim 7, wherein at least one of the replicated indicia is configured to at least partially form more than one of the individual secondary game plays.

10. The method of claim 7, wherein each of the individual secondary game plays is configured to result in a different one of the designated winning game outcomes.

11. The method of claim 1, wherein the indicia are cards.

12. The method of claim 11, wherein the primary game play is a poker game.

13. The method of claim 12, wherein the secondary game play is same poker game.

14. The method of claim 13, wherein the designated winning game outcomes includes at least one of: royal flush, straight flush, and flush.

15. The method of claim 13, wherein the plurality of winning game outcomes of the primary game comprises a royal flush, straight flush, flush, straight, full house, four-of-a-kind, three-of-a-kind, two pair, and a pair.

16. The method of claim 13, wherein each of the card decks is a standard deck without the replicated cards associated with each secondary game play.

17. The method of claim 11, wherein the randomly selected cards for the primary game play are selected from a first card deck.

18. The method of claim 17, wherein the randomly selected cards for the secondary game play are selected from a second card deck.

19. A gaming machine comprising:

a wager acceptor configured to accept a wager to initiate game play;

a processor configured to operate with a display device to:

(a) form and display a primary game play with randomly selected cards from a set of cards, wherein selected cards from the set of cards can form any of a plurality of different winning game outcomes;

(b) determine cards from the primary game play to replicate to at least partially form a secondary game play, wherein the determined cards are only the cards from the primary game play that at least partially satisfy any designated winning game outcome for the secondary game play, wherein at least one and less than all of the winning game outcomes are designated winning game outcomes, each of said designated winning game outcomes being a predetermined different one of said winning game outcomes;

(c) replicate the determined cards from the primary game play to at least partially form the secondary game play, (d) if any cards of the primary game play have been selected to be replaced, replace said cards from the primary game play with randomly selected cards, and (e) if less than a designated quantity of the randomly selected cards from the primary game play have been replicated to at least partially form the secondary game play, randomly select additional cards from the set of cards to complete a formation of the designated quantity in the secondary game play using the additional cards;

said display device in communication with the processor, the display device configured to operate with the processor to display the primary game play and the secondary game play; and a payment system in communication with the processor configured to operate with the processor to provide an award if any of the winning game outcome occurs in the primary game play or if any of the designated winning outcomes occurs in the secondary game play based on any replicated cards from the primary game play and any of said randomly selected additional cards.

* * * * *

UNITED STATES PATENT AND TRADEMARK OFFICE

CERTIFICATE OF CORRECTION

PATENT NO. : 7,914,369 B2
APPLICATION NO. : 11/245852
DATED : March 29, 2011
INVENTOR(S) : Walker et al.

It is certified that error appears in the above-identified patent and that said Letters Patent is hereby corrected as shown below:

In the Claims:

In Claim 19, Column 26, Line 44, replace “outcome occurs” with --outcomes occur--.

Signed and Sealed this
Fourteenth Day of June, 2011

David J. Kappos
*Director of the United States Patent and Trademark Office*